UNITED STATES PATENT OFFICE.

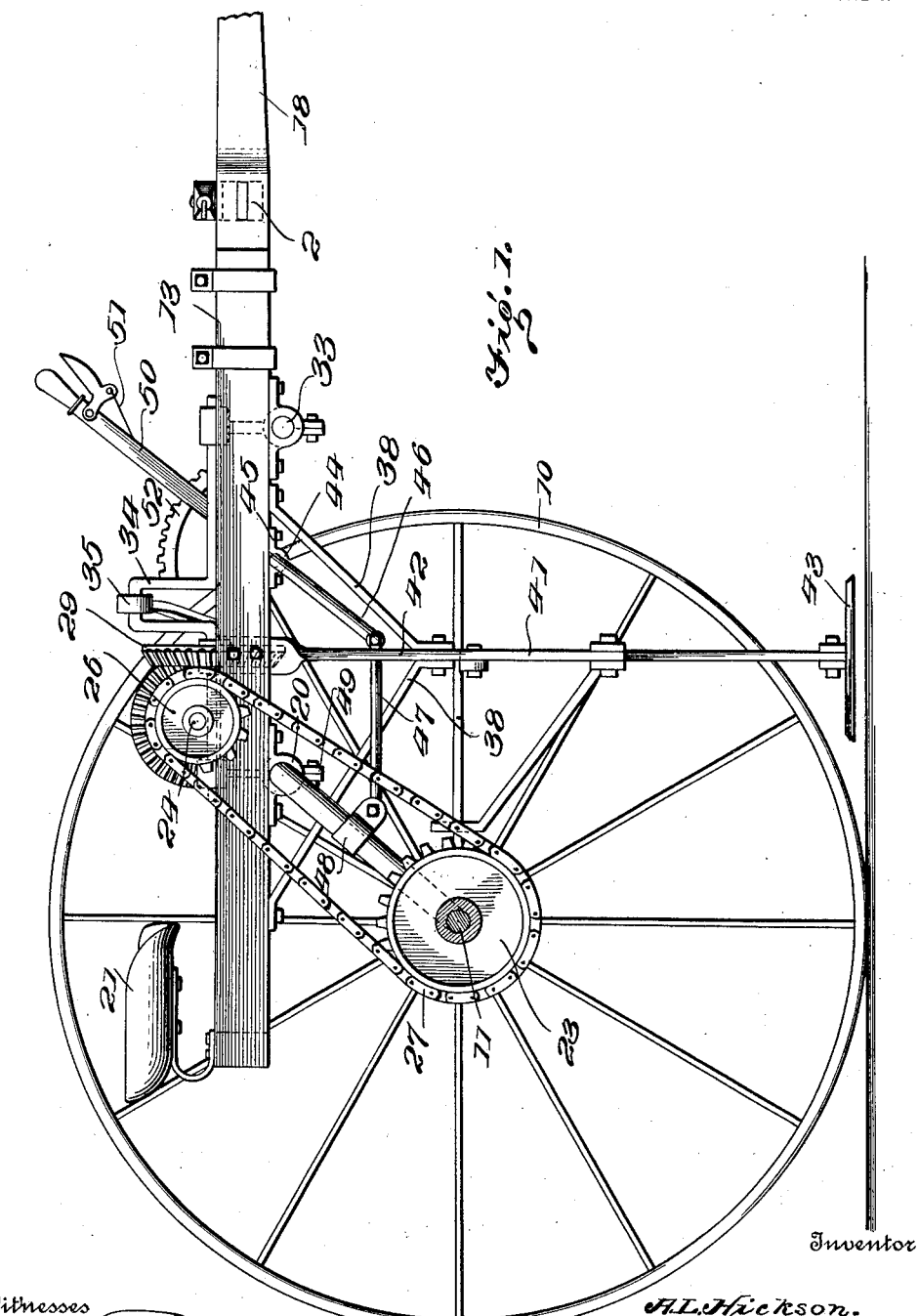

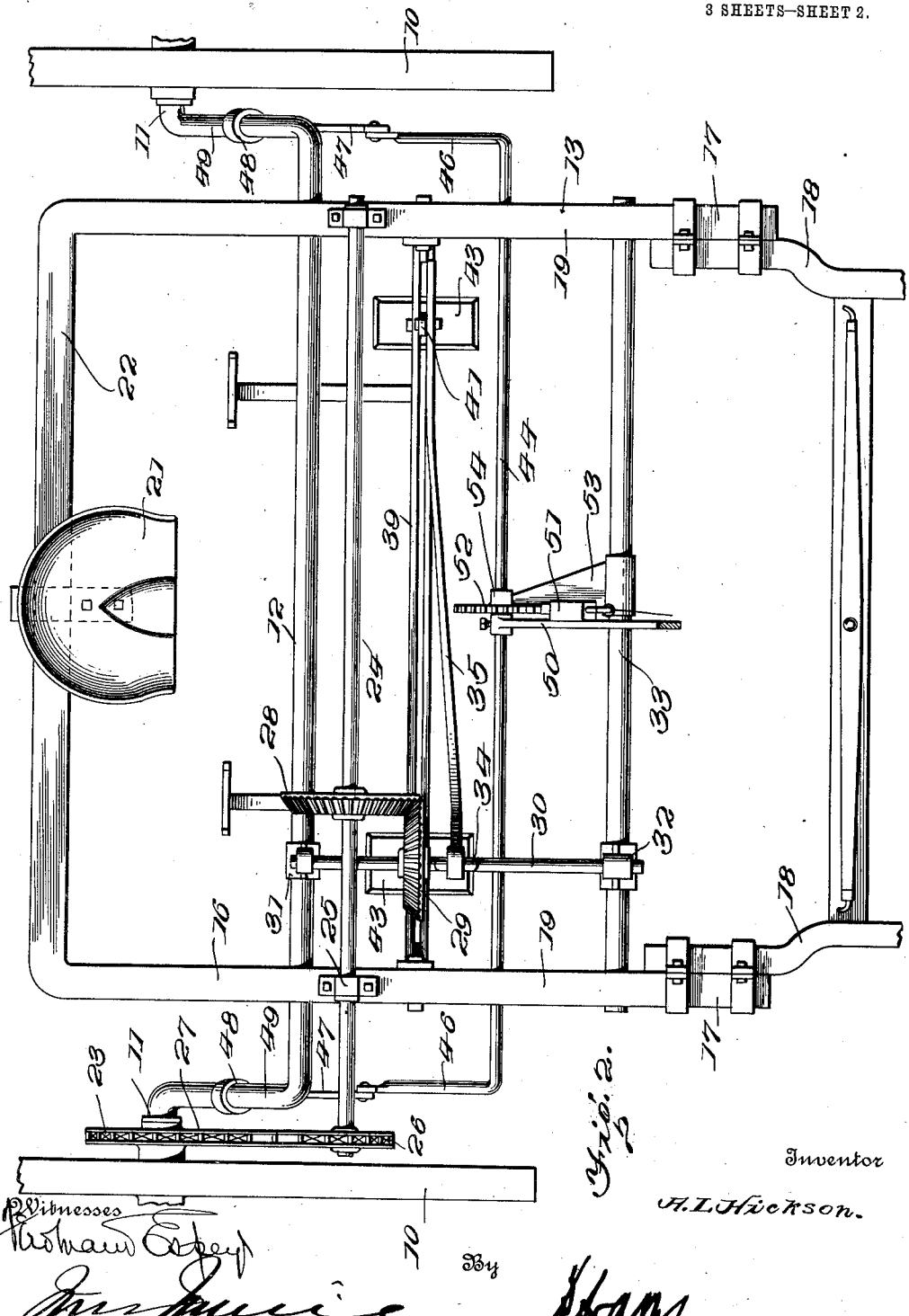

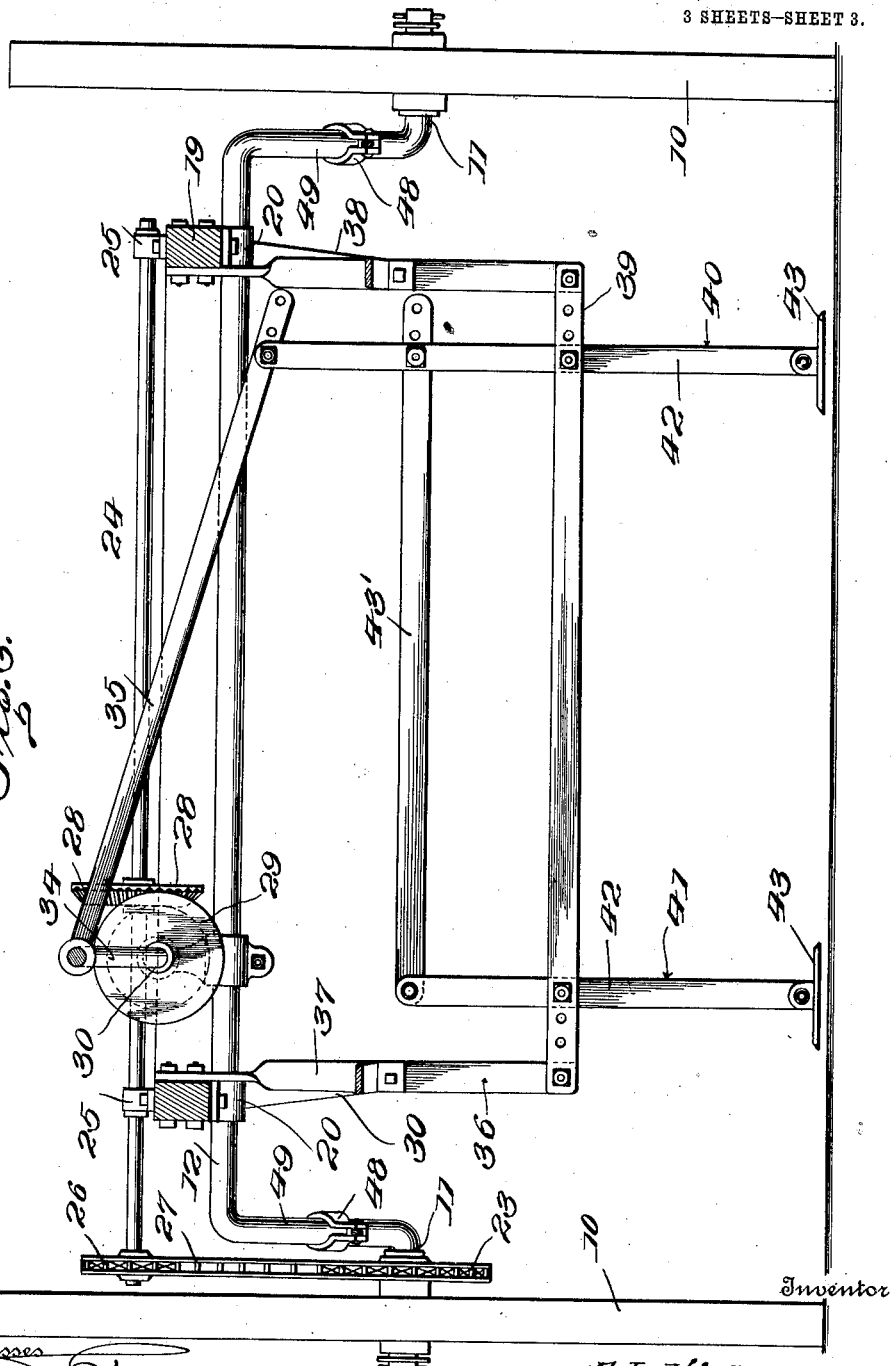

AARON L. HICKSON, OF PADUCAH, TEXAS.

COTTON-CHOPPER.

1,100,239.  Specification of Letters Patent.  Patented June 16, 1914.

Application filed May 16, 1913. Serial No. 768,095.

*To all whom it may concern:*

Be it known that I, AARON L. HICKSON, citizen of the United States, residing at Paducah, in the county of Cottle and State of Texas, have invented certain new and useful Improvements in Cotton-Choppers, of which the following is a specification.

This invention relates to an improvement in cotton choppers.

The primary object of the invention is to provide a cotton chopper in which a plurality of hoes are arranged to work transversely of the line of travel of the machine and in alinement with each other, whereby the draft animal may walk between the two rows on which the hoes are active.

A further object of the invention is to provide a driving means by which the blades will be driven with sufficient rapidity and force without the necessity of driving the vehicle at a high rate of speed, or unduly increasing the pull on the draft animal.

A still further object of the invention is to provide means whereby the cutting mechanism may be raised and lowered without stopping the vehicle or said cutting mechanism.

For a full understanding of the invention, reference is to be had to the following description and accompanying drawings, in which:—

Figure 1 is a longitudinal section; Fig. 2 is a top plan view; and Fig. 3 is a transverse section.

Corresponding and like parts are referred to in the following description and indicated in all the views of the accompanying drawings by the same reference characters.

In the drawings, 10 designates the drive wheels which receive the terminals 11 of the shaft 12. This shaft adjacent its ends is bent at right angles and the ends are again bent at right angles and received within the hubs of the drive wheels. This shaft forms a support for the frame 13 which consists of the substantially U-shaped beam 16, to the terminals 17 of which are secured the shafts 18. The longitudinal bars 19 of the frame support bearings 20 on their under faces which receive the shaft 12, the seat 21 being arranged on the transverse bar 22 of the frame.

A sprocket 23 is mounted on the hub of one of the drive wheels. A driven shaft 24 is supported within bearings 25 disposed on the upper faces of the bars 19 of the frame, said shaft being disposed transversely of the frame. A sprocket 26 is mounted on the shaft 24, a sprocket chain 27 passing over the sprocket 23 and the sprocket 26. Thus, it will be noted that as the vehicle is propelled, the shaft 24 will be driven.

A gear 28 is mounted on the shaft 24, said gear meshing with a gear 29 which is mounted on a counter-shaft 30. The counter-shaft 30 is disposed longitudinally of the frame, being supported by a bearing 31 arranged on the shaft 12, and a bearing 32 arranged on a cross-bar 33 which is disposed transversely of and supported by the frame 13. The shaft 23 is formed with a crank 34 to which is connected a lever 35.

A U-shaped frame 36 is supported by the beams 19, the vertically disposed members 37 of said frame being bolted to the inner sides of the beams 19. These vertical members are supported by braces 38 which are connected to the frame, the intermediate portion 39 of the frame 36 forming a support for the cutting hoes 40 and 41. These hoes, which consist of vertically extending bars 42 and the cutting shoes 43, are pivotally mounted between the spaced bars 39, there being one disposed adjacent each end of the frame 36. The hoes are connected above the bars 39 by a link 43', which has a pivotal connection with each of the hoes. The vertically extending portion of the lever 40 is of a length in excess of that of the lever 41, being connected to the terminal of the lever 35.

When the machine is propelled, the shaft 24 will be rotated and the gear 28 will drive the gear 29, rotating the shaft 30. As the shaft 30 rotates, the lever 35 is reciprocated. When the lever 35 is reciprocated, movement will be imparted to the hoe 40, the hoe being moved transversely of the machine. As the lever 40 is reciprocated, the link 43' will actuate the hoe 41, and the hoes will be simultaneously driven.

By this construction, it will be noted that the draft animal may travel between two rows, and that one of the hoes will be active to one row and the other hoe to the other row. Thus, two rows of cotton may be simultaneously cultivated.

A shaft 44 is rotatably supported on the under faces of the beams 19, said shaft being disposed transversely of the frame and mounted in bearings 45. The terminals 46 of the shaft 44 are disposed at right angles to its body portion, and are connected to links 47, each of the links 47 being secured to a bracket 48 mounted on the portion 49 of the shaft 12. A lever 50 is mounted on the shaft 44, said lever being formed with a ratchet mechanism 51 which engages a segment 52 carried by a bracket 53 which is mounted on the beam 33, the bracket being formed with a bearing 54 through which the shaft 44 passes.

It will be noted that as the lever 50 is actuated to rock the shaft 44, the links 47 will rotate the shaft 12, thus enabling the machine to be adjusted with respect to the ground while in motion, and without in any way interfering with its operation. The hoes are adjustably mounted between the beams 39 and the hoe 40 is adjustable both with respect to the link 43' and the lever 35. The stroke of the hoes may, in this manner, be regulated.

The many advantages of a construction of this character will be clearly apparent, as it will be noted that it provides a chopping mechanism which will be simultaneously active to two rows and in which the chopping is accomplished by a steady stroke and with the utilization of a small amount of power. Attention is also called to the manner of adjusting the frame, and to the fact that said adjustment does not interfere with the operation of the machine. It will also be seen that the structure is such as may be easily and economically manufactured, and that the various parts may be readily assembled.

What I claim is:

1. A cotton chopper comprising a frame having a transverse bar, a pair of hoes adjustably pivoted to said bar, a link connecting the hoes, a lever adjustably pivoted to the upper end of one of the hoes, and means on the frame to reciprocate said lever.

2. A cotton chopper comprising an axle, wheels supporting said axle, a frame mounted on said axle, a U-shaped frame supported by the first-mentioned frame and disposed at right angles thereto, a plurality of hoes pivotally supported by said U-shaped frame, a link connection between the hoes, and means for imparting movement to one of the hoes whereby both hoes will be simultaneously actuated.

3. A cotton chopper comprising an axle, wheels supported on said axle, a frame pivotally mounted on said axle, a second frame disposed at right angles to the first-mentioned frame, said second frame including spaced bars, hoes pivotally supported between said bars, a link connection between said hoes, a lever connected to one of the hoes, and means for reciprocating said lever to simultaneously actuate the hoes.

4. A cotton chopper comprising an axle, wheels supporting said axle, a frame pivotally mounted on said axle, a shaft supported by said frame and driven by one of said wheels, a gear wheel arranged on said shaft, a counter-shaft, a gear wheel arranged on said counter-shaft and meshing with the first-mentioned gear wheel, a crank carried by said counter-shaft, a lever connected to said crank, a plurality of pivotally supported hoes, a link connecting said hoes, and a pivotal connection between one of said hoes and said lever.

5. A cotton chopper comprising an axle, wheels supporting said axle, each of the terminals of said axle being disposed at right angles to its body portion, a frame pivotally mounted on the body portion of the axle, a shaft supported by said frame and disposed parallel with the axle, said shaft being driven by one of said wheels, a counter-shaft supported by said frame and driven by the first mentioned shaft, a second frame supported by the first mentioned frame, said frame including spaced bars, choppers adjustably mounted between said bars, and an operative connection between the counter-shaft and said choppers, whereby the choppers are actuated simultaneously.

In testimony whereof I affix my signature in presence of two witnesses.

AARON L. HICKSON. [L. S.]

Witnesses:
A. A. HICKSON,
J. M. HAWKINS.

---

Copies of this patent may be obtained for five cents each, by addressing the "Commissioner of Patents, Washington, D. C."